United States Patent [19]

Baskerville

[11] Patent Number: 5,865,625
[45] Date of Patent: Feb. 2, 1999

[54] ELECTRONIC FLASH CARD APPARATUS

[76] Inventor: Daryl M. Baskerville, 73 William Henry Dr., Moroe, Conn. 06468

[21] Appl. No.: 733,724

[22] Filed: Oct. 18, 1996

[51] Int. Cl.[6] .................................................... G09B 19/06
[52] U.S. Cl. ........................................... 434/157; 434/322
[58] Field of Search .................................. 434/157, 169, 434/176, 322, 317, 308, 309, 323, 335; 463/9, 1; 704/3, 7

[56] References Cited

U.S. PATENT DOCUMENTS

| | | | |
|---|---|---|---|
| 4,218,760 | 8/1980 | Levy | 434/157 |
| 4,247,895 | 1/1981 | Weber | 434/327 |
| 4,509,137 | 4/1985 | Yoshid | 434/157 |
| 4,551,818 | 11/1985 | Sado et al. | 434/157 |
| 4,710,877 | 12/1987 | Ahmed | 434/157 |
| 4,740,913 | 4/1988 | Washizuka et al. | 434/157 |
| 4,912,671 | 3/1990 | Ishida | 434/157 |
| 5,184,296 | 2/1993 | Matsumoto | 704/3 |
| 5,488,496 | 1/1996 | Pine | 349/96 |
| 5,494,444 | 2/1996 | Thayer et al. | 434/362 |
| 5,697,789 | 12/1997 | Sameth et al. | 434/157 |

*Primary Examiner*—Jerome W. Donnelly
*Assistant Examiner*—Victor K. Hwang

[57] ABSTRACT

An electronic flash card apparatus including a housing with a thin rectangular configuration having a top face, a bottom face, and a periphery formed therebetween defining an interior space. A rectangular display is situated on the front face of the housing. Further provided is an actuator switch situated on the periphery of the housing. Such switch has a first orientation for precluding transmission of an activation signal and a second orientation for transmitting the activation signal. Also included is a key mechanism situated on the housing. A battery compartment is included for powering purposes. Finally, control circuitry is situated within the interior space of the housing and electrically connected to the display, key mechanism, and battery. In operation upon the receipt of the activation signal, the control circuitry is adapted to display randomly chosen inquiries from a predetermined genre of topics, wherein such inquiries have an associated answer. The control circuitry then displays the answer associated with the inquiry upon the depression of the key mechanism.

1 Claim, 3 Drawing Sheets

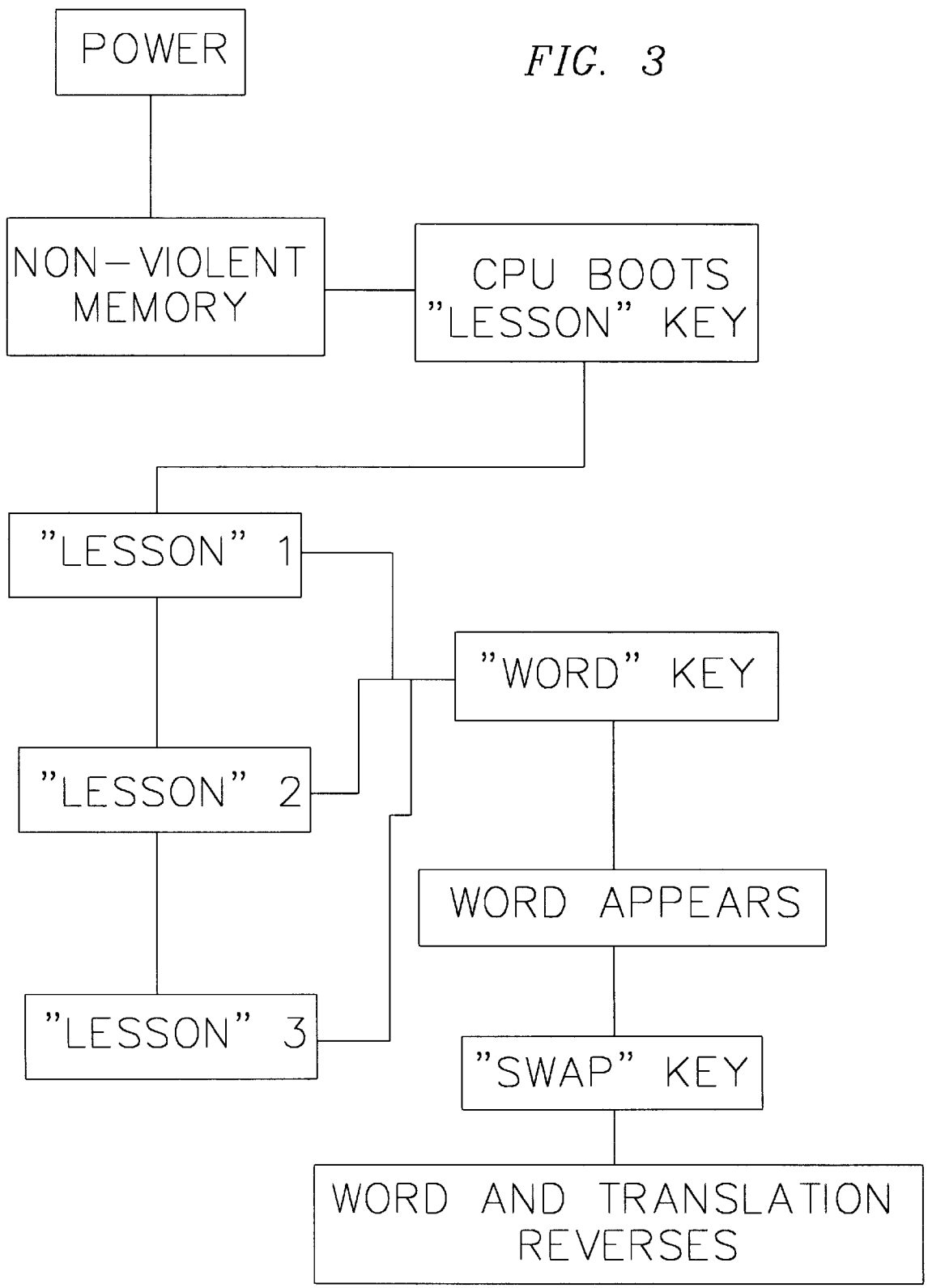

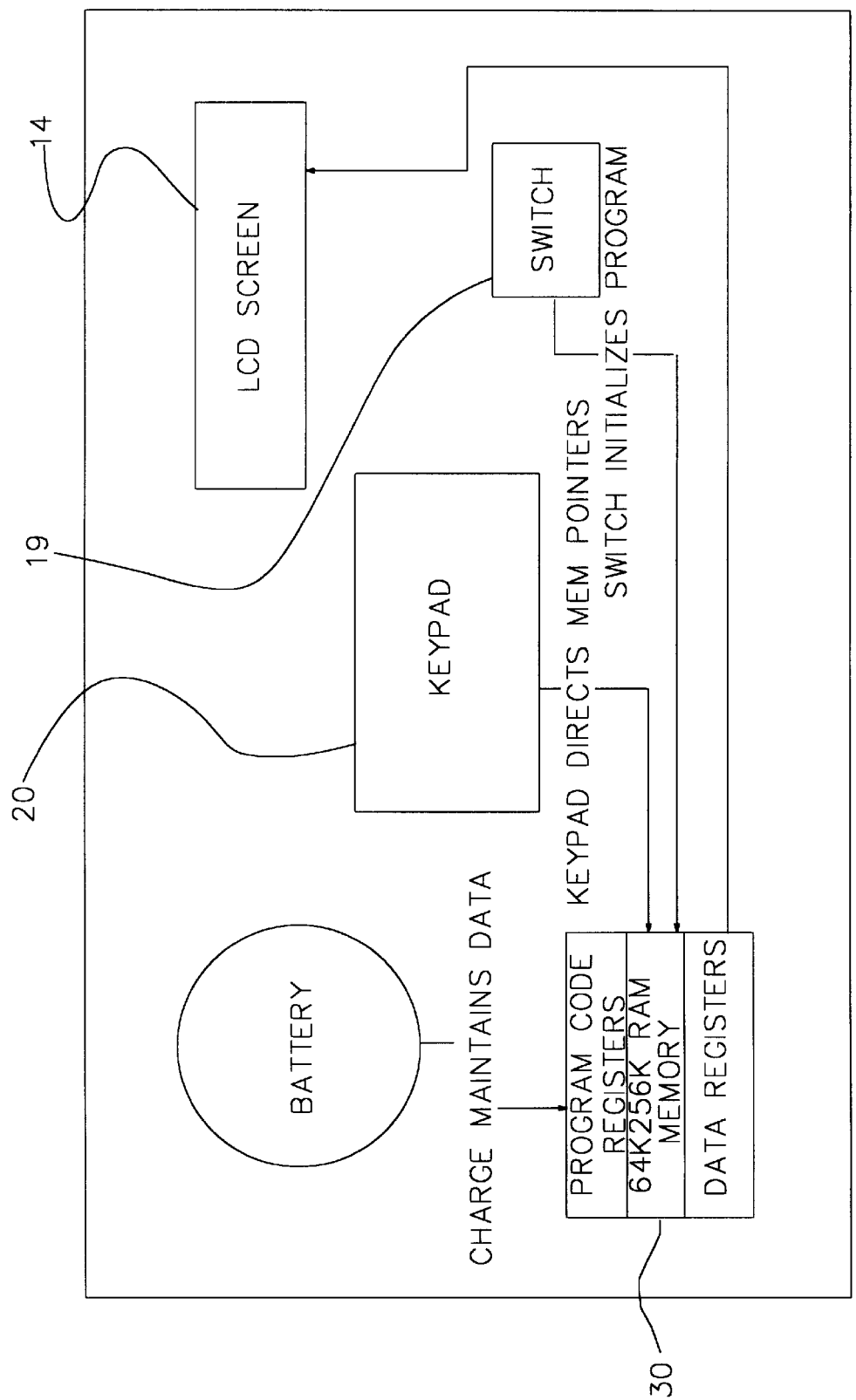

ELECTRONIC FLASH CARD APPARATUS

BACKGROUND OF THE INVENTION

1. Field of the Invention

The present invention relates to an electronic flash card apparatus and more particularly pertains to allowing a user to memorize randomly chosen facts relating to various topics with an electronic device.

2. Description of the Prior Art

The use of translators is known in the prior art. More specifically, translators heretofore devised and utilized for the purpose of translating words of a foreign language are known to consist basically of familiar, expected and obvious structural configurations, notwithstanding the myriad of designs encompassed by the crowded prior art which have been developed for the fulfillment of countless objectives and requirements.

By way of example, the prior art includes U.S. Pat. No. 4,604,698 to Ikemoto, et al; U.S. Pat. No. 4,611,995 to Sado; U.S. Pat. No. 4,636,977 to Ikemoto, et al; U.S. Pat. No. 4,658,374 to Tanimoto et al; and U.S. Pat. No. 5,224,041 to Fushimoto.

In this respect, the electronic flash card apparatus according to the present invention substantially departs from the conventional concepts and designs of the prior art, and in so doing provides an apparatus primarily developed for the purpose of allowing a user to memorize randomly chosen facts relating to various topics with an electronic device.

Therefore, it can be appreciated that there exists a continuing need for a new and improved electronic flash card apparatus which can be used for allowing a user to memorize randomly chosen facts relating to various topics with an electronic device. In this regard, the present invention substantially fulfills this need.

SUMMARY OF THE INVENTION

In view of the foregoing disadvantages inherent in the known types of translators now present in the prior art, the present invention provides an improved electronic flash card apparatus. As such, the general purpose of the present invention, which will be described subsequently in greater detail, is to provide a new and improved electronic flash card apparatus which has all the advantages of the prior art and none of the disadvantages.

To attain this, the present invention essentially comprises a housing with a thin rectangular configuration having a top face, a bottom face, and a periphery formed therebetween defining an interior space. Situated on the front face of the housing adjacent a top edge thereof is a rectangular liquid crystal display. The display has a top half and a bottom half wherein a word may be displayed in both halves. Further provided is an actuator switch situated on the periphery of the housing. The actuator switch has a first orientation for precluding transmission of an activation signal and a second orientation for transmitting the activation signal. As shown in FIG. 1, a plurality of keys are situated on a front face of the housing. Such keys include a word key situated on the front face of the housing below the display adjacent a left edge of the housing. The word key is adapted to transmit a word signal upon the depression thereof. Also included is a swap key situated on the front face of the housing below the display adjacent a right edge of the housing. In operation, the swap key transmits a swap signal upon the depression thereof. Lastly, a lesson key is situated on the front face of the housing below the display between the word key and the swap key. Upon the depression thereof, the lesson key is adapted to transmit a lesson signal. For powering purposes, a battery compartment is situated on the rear face of the housing for allowing containment of a battery. Finally, control circuitry is situated within the interior space of the housing. The control circuitry is electrically connected to the display, word key, swap key, lesson key, and battery. In use upon the receipt of the activation signal, the control circuity displays a word randomly chosen from a first genre of topics in a foreign language on the bottom half of the display. After, the control circuitry then displays a translation of the word in the top half of the display upon the receipt of the word signal. Then upon the receipt of the swap signal, another word is randomly chosen from the first genre of topics and is displayed on the bottom half of the display. At this point, the top half of the display is cleared. At any time, the control circuity is adapted to display a word randomly chosen from another genre of topics upon the receipt of the lesson button. After the depression of the lesson button, the control circuitry functions as if the activation signal has been received for the first time except that the words are randomly chosen from a different genre of topics.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved electronic flash card apparatus which has all the advantages of the prior art translators and none of the disadvantages.

It is another object of the present invention to provide a new and improved electronic flash card apparatus which may be easily and efficiently manufactured and marketed.

It is a further object of the present invention to provide a new and improved electronic flash card apparatus which is of a durable and reliable construction.

An even further object of the present invention is to provide a new and improved electronic flash card apparatus which is susceptible of a low cost of manufacture with regard to both materials and labor, and which accordingly is then susceptible of low prices of sale to the consuming public, thereby making such electronic flash card apparatus economically available to the buying public.

Still yet another object of the present invention is to provide a new and improved electronic flash card apparatus which provides in the apparatuses and methods of the prior art some of the advantages thereof, while simultaneously overcoming some of the disadvantages normally associated therewith.

Still another object of the present invention is to allow a user to memorize randomly chosen facts relating to various topics with an electronic device.

Lastly, it is an object of the present invention to provide a new and improved electronic flash card apparatus including a housing with a thin rectangular configuration having a top face, a bottom face, and a periphery formed therebetween defining an interior space. A rectangular display is situated on the front face of the housing. Further provided is an actuator switch situated on the periphery of the housing. Such switch has a first orientation for precluding transmission of an activation signal and a second orientation for transmitting the activation signal. Also included is a key mechanism situated on the housing. A battery compartment is included for powering purposes. Finally, control circuitry is situated within the interior space of the housing and electrically connected to the display, key mechanism, and battery. In operation upon the receipt of the activation signal, the control circuity is adapted to display randomly chosen inquiries from a predetermined genre of topics, wherein such inquiries have an associated answer. The control circuitry then displays the answer associated with the inquiry upon the depression of the key mechanism.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a flow chart depicting the operation of the present invention.

FIG. 4 is a schematic diagram showing the electrical components of the present invention.

Similar reference characters refer to similar parts throughout the several views of the drawings.

DESCRIPTION OF THE PREFERRED EMBODIMENT

Figure 1:
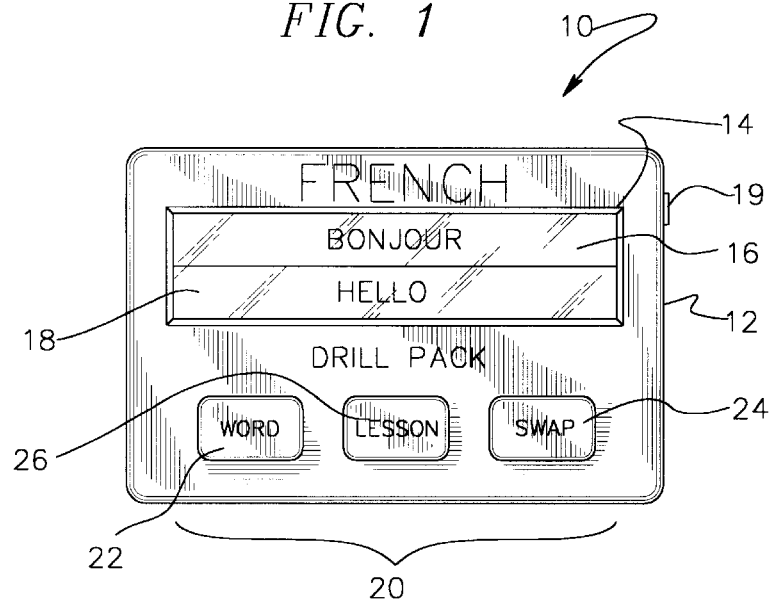
FIG. 1 is an illustration of the preferred embodiment of the electronic flash card apparatus constructed in accordance with the principles of the present invention.
Figure 2:
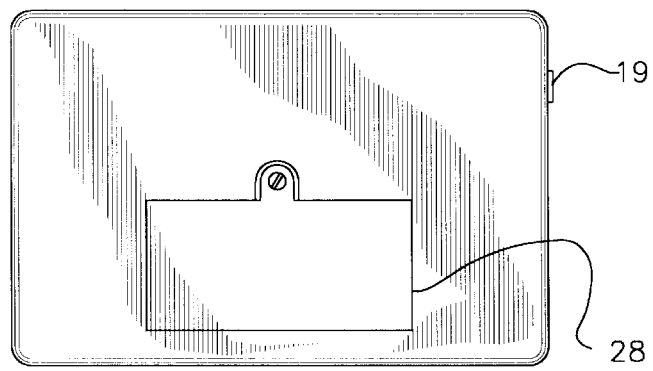
FIG. 2 is a rear elevational view of the present invention.
Figure 2:
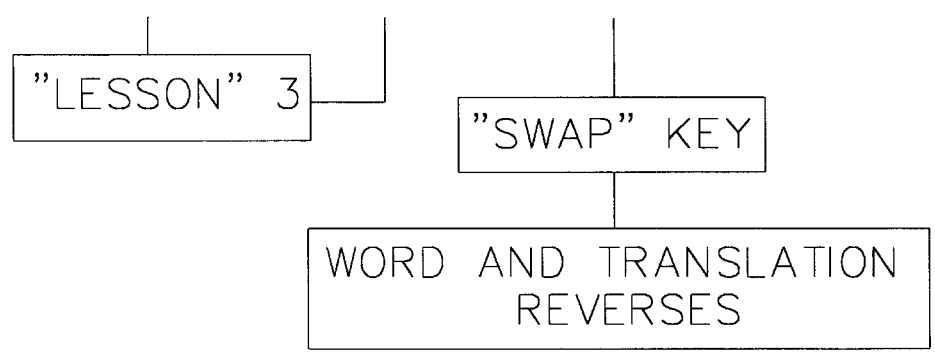

With reference now to the drawings, and in particular to FIG. 1 thereof, a new and improved electronic flash card apparatus embodying the principles and concepts of the present invention and generally designated by the reference numeral 10 will be described.

The present invention, the new and improved electronic flash card apparatus, is comprised of a plurality of components. Such components in their broadest context include a housing, an actuator switch, a word key, a swap key, and a lesson key. Such components are individually configured and correlated with respect to each other so as to attain the desired objective.

More specifically, it will be noted that the system 10 of the present invention includes a housing 12 with a thin rectangular configuration having a top face, a bottom face, and a periphery formed therebetween defining an interior space.

Situated on the front face of the housing adjacent a top edge thereof is a rectangular liquid crystal display 14. The display has a top half 16 and a bottom half 18 wherein a word may be displayed in both halves. Preferably, the display comprises a 40 by 2 line LCD screen manufactured by U.C.E.

Further provided is an actuator switch 19 situated on the periphery of the housing. The actuator switch has a first orientation for precluding transmission of an activation signal and a second orientation for transmitting the activation signal.

As shown in FIG. 1, a plurality of keys 20 are situated on a front face of the housing. Such keys include a word key 22 situated on the front face of the housing below the display adjacent a left edge of the housing. The word key is adapted to transmit a word signal upon the depression thereof. Also included is a swap key 24 situated on the front face of the housing below the display adjacent a right edge of the housing. In operation, the swap key transmits a swap signal upon the depression thereof. Lastly, a lesson key 26 is situated on the front face of the housing below the display between the word key and the swap key. Upon the depression thereof, the lesson key is adapted to transmit a lesson signal.

For powering purposes, a battery compartment 28 is situated on the rear face of the housing for allowing containment of a battery. Preferably, a watch battery is employed.

Finally, control circuitry 30 is situated within the interior space of the housing. The control circuitry is electrically connected to the display, word key, swap key, lesson key, and battery. In use upon the receipt of the activation signal, the control circuity displays a word randomly chosen from a first genre of topics in a foreign language on the bottom half of the display. After, the control circuitry then displays a translation of the word in the top half of the display upon the receipt of the word signal. Then upon the receipt of the swap signal, another word is randomly chosen from the first genre of topics and is displayed on the bottom half of the display. At this point, the top half of the display is cleared. At any time, the control circuity is adapted to display a word randomly chosen from another genre of topics upon the receipt of the lesson button. After the depression of the lesson button, the control circuitry functions as if the activation signal has been received for the first time except that the words are randomly chosen from a different genre of topics. Examples of such genres are the topic of foods, places, famous persons, etc.

To effect proper operation of the control circuitry it is imperative that it be equipped with the proper amount of memory. Ideally, 64K Simms or 256K Simms are utilized. As such, 20 and 200 sets of data are transferred to read only memory. For allowing the control circuitry to govern the operation of the present invention, the control circuitry is ideally equipped with a ZILOG TM Z90A or INTEL TM 8088 processor. CPU initialization code loads programs from a reserved register in the read only memory which then maintains a register pointer that moves from register to register based on key input.

In operation, a user transfers the actuator switch to the second orientation thereof, thereby actuating the device. After, a randomly chosen word is immediately displayed from a genre of topics. The control circuitry then remains static thus allowing a user to attempt to recall the translation of the randomly chosen word displayed. As shown in FIG. 3, a user may depress the word key to verify the correct translation of the word displayed on the bottom half of the display. The control circuitry again remains static until the user depresses the swap key to display another word requiring translation. At any time, the user may depress the lesson key to instruct the control circuitry to display another word randomly chosen from a different genre of topics. As shown in FIG. 3, the control circuitry is adapted to change genres in order upon each depression of the lesson key.

Alternatively, the actuator switch may be equipped with a third orientation which instructs the control circuitry to not wait until the depression of the word key to display a translation of the word in the top half of the display. Instead, the translation is displayed after a predetermined amount of time which is ideally within the range of 5–15 seconds. By this design, a user may exercise the timeliness of recollection of the word translations.

It should be noted that the present invention may easily be altered to allow a user to memorize other facts besides the translation of words without departing from the scope of the present invention. As such, a question may be display instead of a foreign word and further an answer may be displayed in lieu of the translation of such word.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved electronic flash card apparatus comprising, in combination:

a housing with a thin rectangular configuration having a top face, a bottom face, and a periphery formed therebetween defining an interior space;

a rectangular liquid crystal display situated on the top face of the housing adjacent a top edge thereof with a top half and a bottom half wherein a word may be displayed in both halves;

an actuator switch situated on the periphery of the housing having a first orientation for precluding transmission of an activation signal and a second orientation for transmitting the activation signal;

a word key situated on the top face of the housing below the display adjacent a left edge of the housing, the word key adapted to transmit a word signal upon the depression thereof;

a swap key situated on the top face of the housing below the display adjacent a right edge of the housing, the swap key adapted to transmit a swap signal upon the depression thereof;

a lesson key situated on the top face of the housing below the display between the word key and the swap key with the lesson key adapted to transmit a lesson signal upon the depression thereof;

a battery;

a battery compartment situated on the bottom face of the housing for allowing containment of the battery for powering purposes; and control circuitry situated within the interior space of the housing and electrically connected to the display, word key, swap key, lesson key, and battery, the control circuity adapted to display a word randomly chosen from a first genre of topics in a foreign language on the bottom half of the display upon the receipt of the activation signal, then display a translation of the word in the top half of the display upon the receipt of the word signal, whereat another word randomly chosen from the first genre of topics is displayed on the bottom half of the display and the top half of the display is cleared upon the receipt of the swap signal, the control circuity further adapted to display a word randomly chosen from another genre of topics upon the receipt of the lesson signal;

wherein the actuator switch has a third orientation for further transmitting the activation signal that effects operation of the control circuitry in another mode during which a word that is randomly chosen from the first genre of topics is displayed in a foreign language on the bottom half of the display upon the receipt of the activation signal after which a translation of the word is displayed in the top half of the display automatically after 5–15 seconds.

* * * * *

UNITED STATES PATENT AND TRADEMARK OFFICE
CERTIFICATE OF CORRECTION

PATENT NO. : 5,865,625
DATED : Feb. 2, 1999
INVENTOR(S) : Daryl M. Baskerville

It is certified that error appears in the above-identified patent and that said Letters Patent is hereby corrected as shown below:

On the title page, item [76] Inventors, second line, please delete "Moroe" and insert therefor --Monroe--.

Signed and Sealed this

Tenth Day of August, 1999

*Attest:*

Q. TODD DICKINSON

*Attesting Officer*  *Acting Commissioner of Patents and Trademarks*